US007834845B2

(12) United States Patent
Sacher

(10) Patent No.: US 7,834,845 B2

(45) Date of Patent: Nov. 16, 2010

(54) DISPLAY FOR CREATING COLORED IMAGES AND TEXT THAT IS VISIBLE IN INCIDENT LIGHT

(75) Inventor: Friedrich-Josef Sacher, Troisdorf (DE)

(73) Assignee: Aspre AG, Appenzell (CH)

( * ) Notice: Subject to any disclaimer, the term of this patent is extended or adjusted under 35 U.S.C. 154(b) by 734 days.

(21) Appl. No.: 11/884,283

(22) PCT Filed: Feb. 14, 2006

(86) PCT No.: PCT/EP2006/050933

§ 371 (c)(1),
(2), (4) Date: Aug. 14, 2007

(87) PCT Pub. No.: WO2006/087329

PCT Pub. Date: Aug. 24, 2006

(65) Prior Publication Data

US 2008/0122754 A1 May 29, 2008

(30) Foreign Application Priority Data

Feb. 16, 2005 (DE) ........................ 10 2005 007 191
Feb. 26, 2005 (DE) ........................ 10 2005 008 834

(51) Int. Cl.
*G09G 3/34* (2006.01)
*G02B 26/00* (2006.01)

(52) U.S. Cl. ........................ 345/107; 359/296; 359/297

(58) Field of Classification Search .................. 345/107
See application file for complete search history.

(56) References Cited

U.S. PATENT DOCUMENTS

| | | | | |
|---|---|---|---|---|
| 5,771,810 | A * | 6/1998 | Wolcott | 101/483 |
| 6,037,955 | A | 3/2000 | DeBoer et al. | |
| 6,747,777 | B1 | 6/2004 | Sikora et al. | |
| 6,771,237 | B1 | 8/2004 | Kalt | |
| 7,304,620 | B2 * | 12/2007 | Yamamoto et al. | 345/5 |
| 7,359,108 | B2 * | 4/2008 | Hayes et al. | 359/296 |
| 2004/0222435 | A1 | 11/2004 | Shimizu et al. | |

FOREIGN PATENT DOCUMENTS

| | | |
|---|---|---|
| EP | 0580891 | 2/1994 |
| WO | WO 00/00947 | 1/2000 |

* cited by examiner

*Primary Examiner*—Duc Q. Dinh
(74) *Attorney, Agent, or Firm*—Muirhead and Saturnelli, LLC

(57) ABSTRACT

A display for creating colored images and text that is visible in incident light. The screen of the display includes pixels arranged in a grid pattern, each pixel having at least three colored mirrors, arranged next to one another or behind one another for the colors red, green and blue or cyan, magenta and yellow. The mirrors are configured from flat, transparent containers, whose interiors are connected to color reservoirs so that the contents of the latter can be displaced by control electronics in such a way that transparent colored liquid is transported from the color reservoirs to the colored mirrors or vice versa. Light sources, which may each be assigned to a single pixel, are located behind the colored mirrors of the pixels, each individual source being electronically controlled. A white or silver reflective layer, which is partially or temporarily transparent, is positioned behind the colored mirrors.

20 Claims, 1 Drawing Sheet

[Fig. 001]
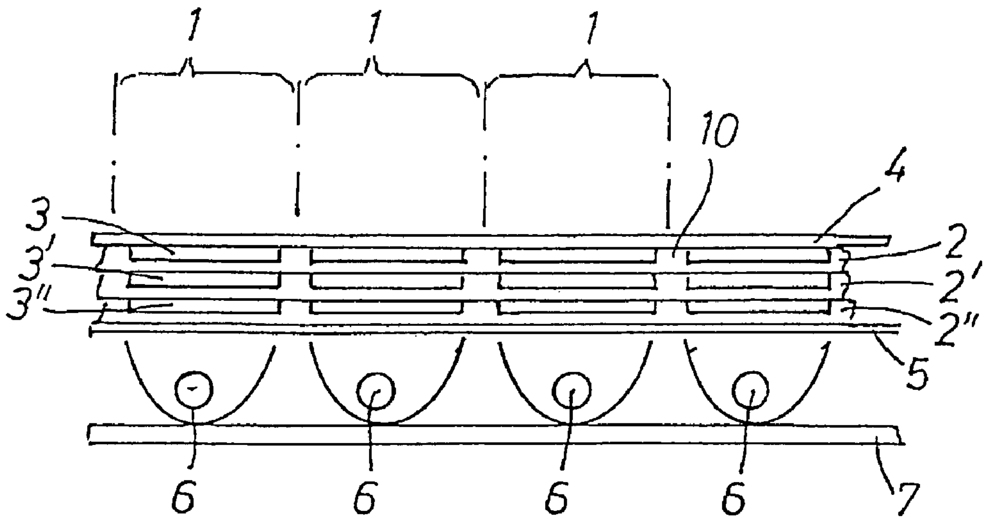
[Fig. 002]
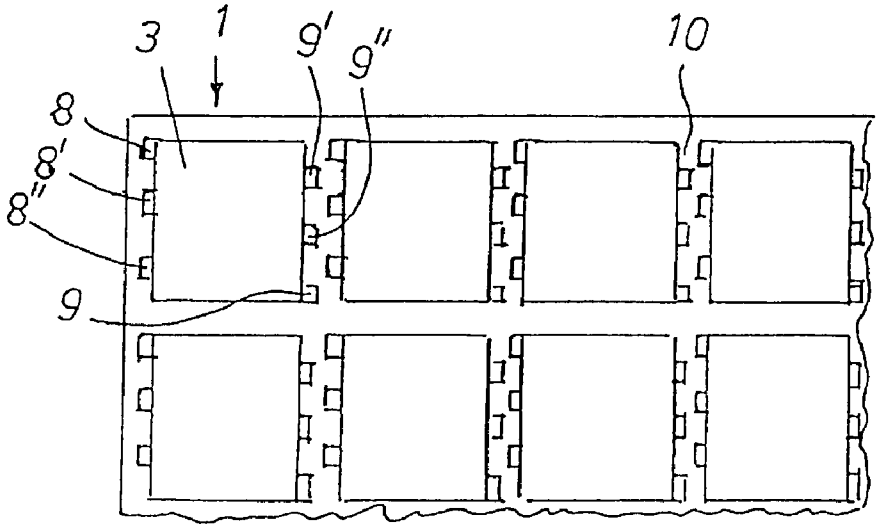
[Fig. 003]
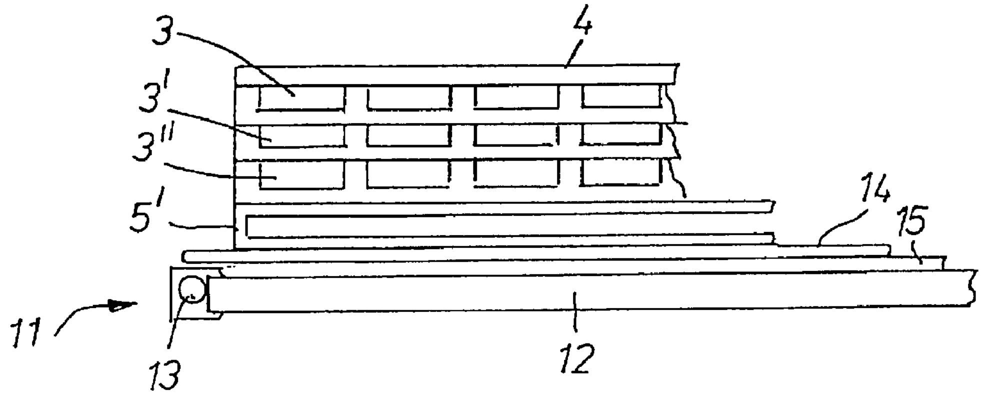

DISPLAY FOR CREATING COLORED IMAGES AND TEXT THAT IS VISIBLE IN INCIDENT LIGHT

TECHNICAL FIELD

The invention pertains to a display for creating color images and texts recognizable by incident light, in which the image area consists of numerous electronically controllable pixels in a raster-like arrangement and in which each pixel has at least three color levels arranged beside one another (side by side) or behind one another (back to back) for the colors red, green, blue or cyan, magenta, yellow that are formed by flat transparent containers and whose inner chambers are connected to color reservoirs whose content can be moved by electronic control in such a way that transparent color fluids is fed from the color reservoirs into the color levels or from the color levels into the color reservoirs.

BACKGROUND OF THE INVENTION

Displays of this type are known from U.S. Pat. No. 6,037,955, U.S. Pat. No. 6,747,777 and EP 1 090 384. With these displays illuminated from outside by sunlight, daylight or lamps there is also the desire—depending on location and time of day—to illuminated the image formed by the pixels also from the back. Therefore, in EP 1 090 384 it is already suggested that one or more light sources be arranged behind the color levels made of transparent material and in front of the color reservoirs, so that the image formed by the pixels is also visible in darkness.

Accordingly, it would be desirable to create a color display, in which there is the possibility, with incident light particularly daylight, to optically highlight and/or color-wise alter parts of the image formed by the controlled pixels.

SUMMARY OF THE INVENTION

According to the system described herein, light sources are arranged behind the color levels of the pixels, each of the light sources being allocated to one pixel and being individually electronically controllable.

With the help of these light sources parts of the image illuminated by daylight can be optically highlighted or altered in their colors. The color mixing can take place—as in a color TV—by additive mixing of the three basic colors red, green blue, or—as in the case of color photography—by subtractive mixing of the colors yellow, magenta, and cyan.

The light sources allocated to the pixels could especially be white light emitting diodes.

The light sources could however also consist of plane illuminating bodies that illuminate a larger number of pixels from the back and of masks arranged between the illuminating bodies and the color levels of the pixels, which can be controlled for each pixel in such a way that the light passage through the mask is open for each pixel or more or less closed.

For backlighting of a larger pixel field, particularly illuminating device as known in flat screens are suitable, which consist of a rectangular or quadratic light-conducting illuminating surface covering the pixel field and light emitting diodes (LEDs) or cathode ray tubes arranged on the side edges of the illuminating surface.

The masks can be formed by polarization filters, whose light passage can be controlled for each pixel with the help of electronic fields. Two polarization filters can be arranged and controlled in such a way that they block passage of all planes of polarization of the light. The polarization filters are foil-type and can be placed directly on the illuminating surface.

So that the color levels can give an as brilliant image as possible with incident daylight, a white or silvery but non-reflective reflection layer, that is partially or temporarily light-permeable, is arranged behind the layer of the color level. The reflection layer can be formed by a milky-turbid glass surface or plastic foil, or by a glass pane or plastic foil that is provided with a mat, white or silvery structure.

For improving the reflection of incident light and for improving the light-permeability of the backlighting a reflection layer is suggested that contains leaf-shaped white or silvery pigments, and the pigments can be aligned parallel to the layer plane or perpendicular to it by means of an electrical or magnetic field. The swimming leaf-shaped pigments distributed uniformly in a fluid form a good reflection layer when they are aligned parallel to the layer plane, and this layer is largely light-permeable when the leaf structure of the pigments extends perpendicular to the reflection plane.

However, the reflection layer can also be formed from one flat container made of transparent material that is filled with a white or silvery color, when this layer is not supposed to reflect, and is filled with a clear transparent fluid when it is supposed to be light-permeable.

The flat containers filled with white or silvery color fluid or with colorless fluid can be arranged behind a pixel field or even as fourth color level for each pixel. In both cases, the display can be switched over from day operation to night operation by changing the white or silvery reflection layer to a light-permeable layer allowing backlighting.

BRIEF DESCRIPTION OF DRAWINGS

In the following description design embodiments of the invention are explained in more details on the basis of drawings.

FIG. 1 shows a sectional view of a portion of the display according to the invention an embodiment of the system described herein.

FIG. 2 shows a top view on eight pixels of the display shown in FIG. 1.

FIG. 3 shows a sectional view of a pixel field with flat backlighting.

DETAILED DESCRIPTION OF VARIOUS EMBODIMENTS

Each pixel 1 of the display has three color level layers 2, 2', 2"—with an upper color level 3, a central color level 3' and a rear color level 3". The color levels 3, 3', 3" are flat containers made of transparent material that are connected to color reservoirs through channels 8, 8', 8" and 9, 9', 9". Transparent color fluids of the colors CYAN, MAGENTA and YELLOW (CMY) or RED, GREEN, BLUE (RGB) can be moved out of the color reservoirs into the color levels 3, 3', 3" and back into the color reservoirs. The color fluid can be moved back and forth against an air cushion, or it can be moved along with a non-mixable colorless fluid in a closed loop or back and forth. If the color levels 3, 3', 3", the channels 8, 8', 8" and 9, 9', 9" as well as the corresponding color reservoir are partly filled with a color fluid and partly with a colorless fluid that is non-mixable with the color fluid, and transportation of the color fluid and the colorless fluid takes place in the known method by means of electro-wetting (U.S. Pat. No. 6,037,955) or by means of another micro-pump, then the color fluids can be fed to the color levels 3, 3', 3" through the channels 8, 8', 8" and simultaneously the colorless fluid can be drained from the color levels 3, 3', 3" through the channels 9, 9', 9" or vice-versa. Behind the color levels 3, 3', 3" of each pixel 1 a light source 6 is arranged, in particular a white emitting LED. This light source can be switched on and off independent of the other light sources 6 and, if required, can also be controlled in light intensity. These light sources are fixed on a carrier plate 7.

Behind the color levels and in front of the light sources 6 there is a light-permeating white or silvery reflection layer 5, which can be formed by a plastic foil or a thin glass pane and whose light-permeability is at least 40%.

According to FIG. 3 the reflection layer can also be formed by a flat container 5', in which leaf-shaped silvery pigments swim in a fluid, which can be aligned parallel to the layer or perpendicular to it.

This flat container 5' covering one pixel field can however also be connected to a system that is filled with two fluids that cannot be mixed with one another. One fluid is a white or silvery color fluid and the other fluid is colorless fluid or a colorless gas. With the help of electro-wetting or a micro-pump the fluids can be moved in such a way that the transparent flat container is filled only with white or silvery color, or only with the colorless clear transparent fluid, depending on whether this layer is supposed to reflect the incident light or is supposed to allow the back-illuminating light to pass through.

The color reservoirs (not shown) are arranged behind the reflection layer, so that the color fluids can be moved out of the visible range of the person observing the display.

In FIG. 3 the light sources allocated to the pixels consist of a plane illuminating device that consists of a light-conducting luminous surface 12, on whose side edges cathode ray tubes 13 or light emitting diodes are arranged, and two polarization filters 14, 15 serving as masks.

The size of the pixels 1 is dependent on the size of the display and the distance of the observer from this display and lies in the range of 0.5 $mm^2$ to 16 $mm^2$, that in case of a quadratic pixel conforms to a pixel width of 0.7 to 4 mm.

The channels 8, 9; 8', 9' and 8", 9" leading from the color reservoirs behind the reflection layer to the color levels 3, 3', 3" are worked into the webs 10 that separate the pixels 1 or their color levels 3, 3', 3" from one another and that rest with their surface against under face of the cover layer 4 as well as lie against the front and middle color level layer 2 and 2' and are tightly welded or affixed on to them.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. Display for creating color images and text visible in incident light, comprising:

an image area that includes a plurality of electronically controllable pixels in a raster-like arrangement and in which each pixel has at least three color levels arranged beside one another or behind one another for the colors red, green, blue or cyan, magenta, yellow that are formed by flat transparent containers, wherein the flat transparent containers include inner chambers that are connected via channels to color reservoirs, wherein content of the color reservoirs can be moved by electronic control in such a way that transparent color fluids is fed from the color reservoirs into the color levels or from the color levels into the color reservoirs, and wherein light sources are arranged behind the color levels of the pixels, each of the light sources being allocated to one pixel and being individually electronically controllable.

2. The display according to claim 1, wherein the light sources are white emitting light emitting diodes (LED).

3. The display according to claim 1, wherein the light sources controllable for each pixel include at least one plane illuminating device back-illuminating a larger group of pixels and a mask arranged between the illuminating devices and the color levels of the pixels, which can be controlled for each pixel in such a way that the light passage through the masks is open or substantially shut.

4. The display according to claim 3, wherein the masks are formed by polarization filters, the polarization filters including a light passage or filter effect that can be controlled by means of electric fields for each pixel.

5. The display according to claim 1, further comprising:

a white or silvery reflection layer arranged behind the color levels that is partly or temporarily light-permeable.

6. The display according to claim 5, wherein the reflection layer is formed by plastic foil or thin glass pane provided with a light-permeable, mat white or silvery layer.

7. The display according to claim 1, further comprising:

a layer with silvery or white leaf-shaped pigments arranged behind the color levels and in front of the light sources, wherein by means of an electrical or magnetic field, the pigments can be aligned parallel to the display plane and thus form a reflection layer or the pigments can be aligned perpendicular to the display plane and thus form a light-permeating layer.

8. The display according to claim 1, further comprising:

a reflection layer is arranged behind the light sources and the color levels, which is formed by a flat container made of transparent material that can be filled with a white or silvery color when the layer is supposed to reflect the light, and with a clear transparent fluid when the layer is supposed to be light-permeable.

9. The display according to claim 1, further comprising:

a fourth color level fixed behind the three color levels and in front of the light source of a pixel, which can be filled with an opaque white or silvery color or with a clear transparent medium.

10. The display according to claim 4, further comprising:

a layer with silvery or white leaf-shaped pigments arranged behind the color levels and in front of the light sources, wherein by means of an electrical or magnetic field, the pigments can be aligned parallel to the display plane and thus form a reflection layer or the pigments can be aligned perpendicular to the display plane and thus form a light-permeating layer.

11. The display according to claim 4, further comprising:

a reflection layer arranged behind the light sources and the color levels, which is formed by a flat container made of transparent material that can be filled with a white or silvery color when the layer is supposed to reflect the light, and with a clear transparent fluid when the layer is supposed to be light-permeable.

12. The display according to claim 4, further comprising:

a fourth color level fixed behind the three color levels and in front of the light source of a pixel, which can be filled with an opaque white or silvery color or with a clear transparent medium.

13. A display, comprising:

an image area;

control electronics;

a plurality of pixels disposed in the image area and controlled by the control electronics, wherein each pixel has a plurality of color levels, each color level including at least one transparent chamber, wherein the transparent chamber is coupled to at least one color reservoir, wherein a content of the color reservoir is controlled by the control electronics and moved between the color reservoir and the transparent chamber; and a plurality of light sources disposed adjacent to the color levels of the plurality of pixels, each of the light sources being allocated to at least one pixel and controlled independently of other light sources.

14. The display according to claim 13, further comprising:

a mask disposed between at least one light source and the color levels of at least one pixel, wherein the mask controls a light passage from the at least one light source and to the color levels of the at least one pixel.

15. The display according to claim 13, further comprising:

a reflection layer disposed adjacent to the light sources and the color levels, wherein the reflection layer is partly or temporarily light-permeable.

16. The display according to claim 15, wherein the reflection layer includes a transparent container that is filled with a white or silvery fluid when the layer is to reflect light, and filled with a clear transparent fluid when the layer is to be light-permeable.

17. A method for controlling a display, comprising:

providing a plurality of pixels disposed in an image area, wherein each pixel has a plurality of color levels, each color level including at least one transparent chamber, wherein the transparent chamber is coupled to at least one color reservoir, electronically controlling a content of the color reservoir to move the content between the color reservoir and the transparent chamber, providing a plurality of light sources disposed adjacent to the color levels of the plurality of pixels, each of the light sources being allocated to at least one pixel and controlled independently of other light sources.

18. The method according to claim 17, further comprising:

disposing a mask between at least one light source and the color levels of at least one pixel, wherein the mask controls a light passage from the at least one light source and to the color levels of the at least one pixel.

19. The method according to claim 17, further comprising:

disposing a reflection layer adjacent to the light sources and the color levels, wherein the reflection layer is partly or temporarily light-permeable.

20. The method according to claim 19, further comprising:

controlling the reflection layer by filling a transparent container of the reflection layer with a white or silvery fluid when the layer is to reflect light and with a clear transparent fluid when the layer is to be light-permeable.

* * * * *